United States Patent
Palacharla et al.

(10) Patent No.: US 11,646,606 B2
(45) Date of Patent: May 9, 2023

(54) RECEIVE AND TRANSMIT COIL PAIR SELECTION

(71) Applicant: Microsoft Technology Licensing, LLC, Redmond, WA (US)

(72) Inventors: Praveen Kumar Palacharla, Redmond, WA (US); Jay Michael Fassett, Edmonds, WA (US); Daniel Tsuteh Chian, Los Altos, CA (US); Rubén Caballero, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/155,897

(22) Filed: Jan. 22, 2021

(65) Prior Publication Data
US 2022/0239158 A1    Jul. 28, 2022

(51) Int. Cl.
*H02J 50/40*    (2016.01)
*H02J 50/90*    (2016.01)
*H02J 50/10*    (2016.01)
*H02J 50/70*    (2016.01)

(52) U.S. Cl.
CPC ............ *H02J 50/402* (2020.01); *H02J 50/10* (2016.02); *H02J 50/70* (2016.02); *H02J 50/90* (2016.02)

(58) Field of Classification Search
None
See application file for complete search history.

(56) References Cited

U.S. PATENT DOCUMENTS

| | | | |
|---|---|---|---|
| 10,644,542 B2 | 5/2020 | Yankowitz | |
| 2011/0222154 A1* | 9/2011 | Choi | H04N 13/332 359/464 |
| 2012/0248893 A1 | 10/2012 | Teggatz et al. | |
| 2012/0249064 A1* | 10/2012 | Negishi | H02J 50/402 320/108 |
| 2014/0094116 A1* | 4/2014 | Walley | H02J 50/80 455/41.1 |
| 2014/0191568 A1 | 7/2014 | Partovi | |
| 2016/0134154 A1 | 5/2016 | Baarman et al. | |
| 2017/0005481 A1* | 1/2017 | Von Novak, III | H02J 7/025 |

(Continued)

FOREIGN PATENT DOCUMENTS

| | | |
|---|---|---|
| CN | 204103540 U | 1/2015 |
| CN | 110376763 A | 10/2019 |

(Continued)

OTHER PUBLICATIONS

Gong, et al., "An NFC on Two-Coll WPT Link for Implantable Biomedical Sensors under Ultra-Weak Coupling", In Journal of Sensors, vol. 17, Issue 6, Jun. 11, 2017, 20 Pages.

(Continued)

*Primary Examiner* — Jared Fureman
*Assistant Examiner* — Joel Barnett
(74) *Attorney, Agent, or Firm* — Schwegman Lundberg & Woessner, P.A.

(57) ABSTRACT

A machine implemented method includes alternately energizing multiple transmit coils in a first device, receiving indications of received signal strength at receive coils in a second device, selecting a first pair of coils including a first transmit coil and a first receive coil having the greatest received signal strength, and transferring energy from the first transmit coil to the first receive coil.

20 Claims, 4 Drawing Sheets

(56) References Cited

U.S. PATENT DOCUMENTS

| | | | |
|---|---|---|---|
| 2017/0054318 A1 | 2/2017 | Matsuyuki et al. | |
| 2018/0034327 A1 | 2/2018 | Ren et al. | |
| 2018/0062704 A1 | 3/2018 | Singh et al. | |
| 2018/0262060 A1* | 9/2018 | Johnston | H02J 7/025 |
| 2018/0294673 A1* | 10/2018 | Bae | H02J 7/02 |
| 2019/0097472 A1* | 3/2019 | Mishriki | H04B 5/0037 |
| 2020/0081490 A1 | 3/2020 | Rothkopf et al. | |
| 2021/0184509 A1* | 6/2021 | Muryanto | H02J 50/90 |

FOREIGN PATENT DOCUMENTS

| | | | |
|---|---|---|---|
| EP | 2713473 A2 | 4/2014 | |
| EP | 3608705 A1 | 2/2020 | |
| JP | 2009251068 A | 10/2009 | |
| JP | 2018028147 A | 2/2018 | |

OTHER PUBLICATIONS

"International Search Report and Written Opinion Issued in PCT Application No. PCT/US21/063949", dated Apr. 7, 2022, 11 Pages.

* cited by examiner

RECEIVE AND TRANSMIT COIL PAIR SELECTION

BACKGROUND

An inductive power supply may be used to supply wireless power to power or charge secondary devices. In some known inductive power supplies, secondary devices are powered or charged by placing them on a charging surface. Many inductive power supplies limit spatial freedom by requiring specific placement and orientation of the remote device with respect to the inductive power supply.

In some known inductive power supply systems, a single primary coil is embedded in a charging surface of a charging device and a single secondary coil is embedded in a secondary device. The secondary coil may be aligned in close proximity to the primary coil embedded in the charging device. Power is provided from an input to the charging device, sometimes referred to as a wireless power supply. An AC signal may be provided the primary coil to produce an electromagnetic field. The secondary coil is positioned to reside in the electromagnetic field to receive the electromagnetic energy, producing an AC current in the secondary coil. The AC current can be rectified into DC power to directly power a load, such as charging a battery. The battery may thus be recharged in a manner referred to as wireless recharging.

SUMMARY

A machine implemented method includes alternately energizing multiple transmit coils in a first device, receiving indications of received signal strength at receive coils in a second device, selecting a first pair of coils including a first transmit coil and a first receive coil having the greatest received signal strength, and transferring energy from the first transmit coil to the first receive coil.

DETAILED DESCRIPTION

Figure 1:
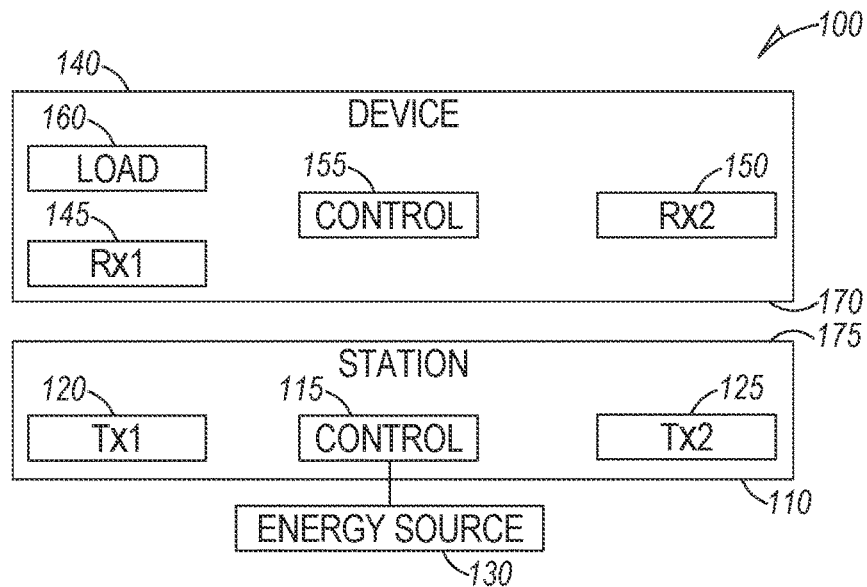
FIG. 1 is a block diagram illustrating a system for wireless energy transfer according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof, Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include, communication media such as transmission media for wireless signals and the like.

Inductive wireless charging devices can be challenging, as a receive coil on a device to be charged can be difficult to position close to a transmitting coil on a recharging station. For virtual and augmented reality smart glasses or goggles, the receive coil may be located on an earpiece, such as one of the stems designed to fit over the ear when worn by a user. When the stems are folded, and the goggles are placed in a recharging station, the distance between the receive coil and the transmitting coil can change depending on which stem is folded first. The change in distance can cause inefficient charging, or even failure to charge, as coil distances have a great effect on energy transfer.

In various examples of inventive subject matter, two or more sets of receive (Rx) and transmit (Tx) coils are provided in a respective device and charging station. Various pairs of Rx and Tx coils are tested for received signal strength, and the pair or set with the best received signal strength is selected for use in inductive wireless charging to transfer energy. Such pair is usually the Tx and Rx coils that are closest to each other. Selecting such a pair for energy transfer can provide one or more of higher efficiency, lower heat loss, compact designs, better user experience, and simpler mechanical design.

FIG. 1 is a block diagram illustrating a system 100 for wireless energy transfer. A charging station 110 includes control circuitry 115 coupled to control a first transmit (Tx) coil 120 and a second transmit coil 125. The charging station 110 may be coupled to an energy source 130 to provide energy to be transmitted by the first and second transmit coils 120 and 125. The source 130 may be an AC source or a DC source such as a battery. Energy is converted by the control electronics 115 to suitable AC for wireless transmission via electromagnetic energy by coils 120 and 125.

A device 140 includes receive first and second receive (Rx) coils 145 and 150. The receive coils 145 and 150 are coupled to device control circuitry 155 for controlling the receive coils, receiving energy from the receive coils and for providing received energy to a sink or load, such as a battery 160. The control circuitry 155 may also receive energy from battery 160.

Device 140 in one embodiment comprises smart goggles for use in augmented or virtual reality applications. Device 140 may include any other type of rechargeable device in further examples such as smartphones, smart watches, headphones, and other devices.

One or more of the coils may be formed via heat staking and copper etching on a plastics enclosure and shaping the surfaces of the plastic enclosure to minimize distance of the coils to the surfaces. Distance between transmit and receive coils can greatly affect the efficiency of energy transfer. As shown in FIG. 1, the distance of receive coil 150 to the surface 170 of device 140 is greater than the distance between receive coil 145 and surface 170.

When device 140 is placed near or in contact with surface 175 of station 110 the distance between transmit coil 120 and receive coil 145 is less than the distance between transmit coil 125 and receive coil 150. In various examples, the system 100 determines which pair of receive and transmit coils will more efficiently transfer energy and selects that pair for such transfer.

Figure 2:
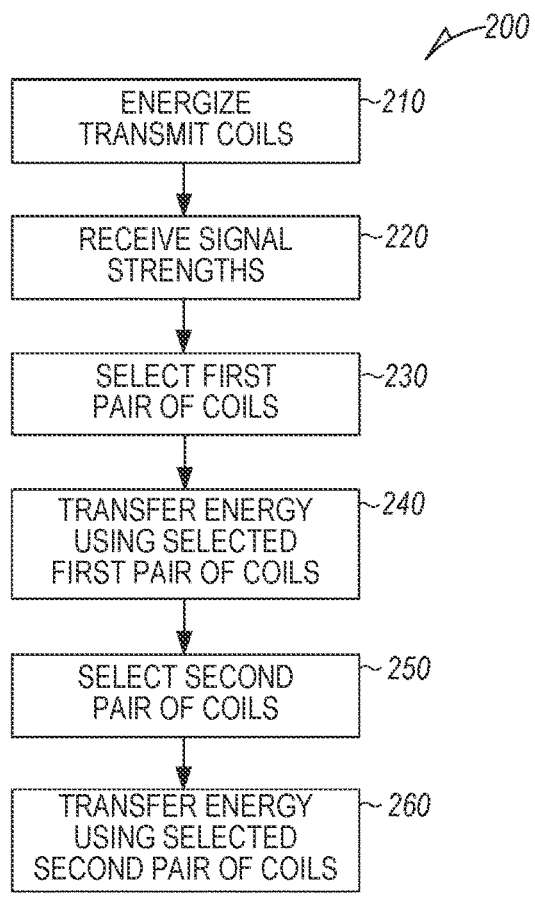
FIG. 2 is a flowchart of a machine implemented method for selecting an efficient pair of coils for energy transfer according to an example embodiment.

FIG. 2 is a flowchart of a machine implemented method 200 that includes operations to select an efficient pair of coils for energy transfer. At operation 210 multiple transmit coils in a first device, such as charging station 110, are alternately energized. Alternately energizing the transmit coils comprises sequentially polling the transmit coils. Such polling may include short. AC signals comparable to charging signals and of sufficient duration to enable measurement or detection of signal strength. Other signals may be used in further embodiments.

Signal strength may be measured as the power (P) of the signal received by a receive coil. Signal strength may be reported in dBm or may be normalized to a digital number. In one embodiment, the received signal may be measured as root mean square (RMS) voltage or current. The received power may be calculated as simply the RMS voltage divided by the coil impedance expressed as a resistance value.

Indications of received signal strength at one or more receive coils in a second device, such as device 140 are received from device 140 via control electronics 155 at operation 220. If the distance between coils is too far, no signal will be received. In such a case, either no indication will be provided, or an indication of no signal received may be provided.

At operation 230, a first pair of coils including a first transmit coil and a first receive coil having the greatest received signal strength are selected. Energy is transferred at operation 240 from the first transmit coil to the first receive coil. In system 100, the selected coils would be transmit coil 120 and receive coil 145 as those appear to be closest and would thus have the highest received signal strength.

In one example, the first device is a charging station and the second device is a battery powered device having a battery that receives the transferred energy. The second device is foldable such that receive coils change position in response to folding the second device. The second device may be a pair of smart glasses that includes foldable ear stems, each stem having a receive coil. When folded, one stein fits over the other such that when placed in the charging station, which may be keyed, one receive coil is further away from the charging station transmit coils than the other. Keying provides for registration and hence consistent placement of device 140 in station 110.

When folded, the receive coils may also be laterally displaced from each other. The charging station has two charging coils positioned to align with the receive coils of the folded ear stems.

Method 200 may further include selecting a second pair of coils including a second transmit coil and a second receive coil having the second greatest received signal strength at operation 250. At operation 260, energy may be transferred from the second transmit coil to the second receive coil. The control electronics 155 may use energy from both pairs to charge battery 160 more quickly.

In one embodiment, the presence of the second device prior to alternately energizing multiple transmit coils by polling the transmit coils and detecting a response. In a further embodiment, upon identification of a pair of coils, a charging parameter may be received from device 140. The charging parameter may include one or more parameters indicative of one or more of charging mode, or state of the battery 160. The state of the battery 160 may be used to terminate energy transfer. The parameters may be used to control the energy transfer.

Figure 3:
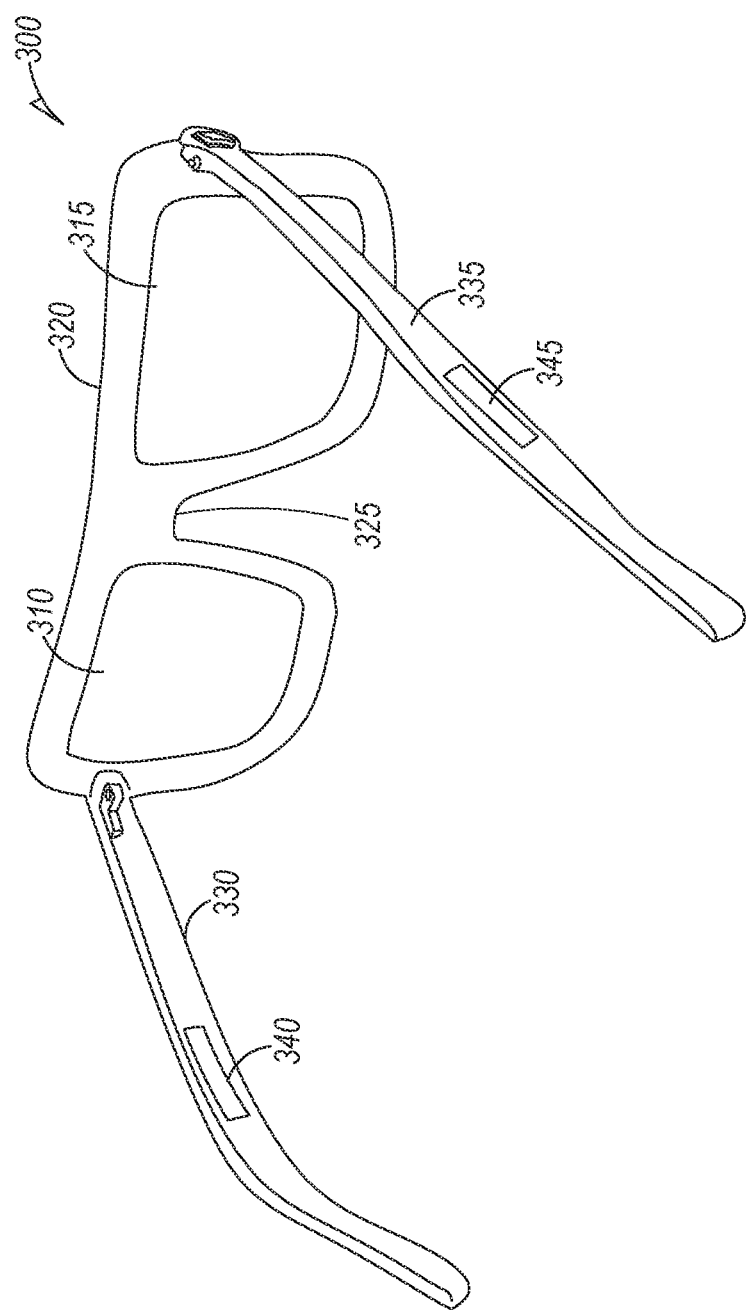
FIG. 3 is a block perspective representation of a smart goggle according to an example embodiment.

FIG. 3 is a block perspective representation of a smart goggle 300 having the shape of a pair of glasses, with left and right displays 310, 315 supported by a frame 320 having a nose bridge 325 coupled between the displays 310 and 315, and a left ear piece 330 and right earpiece 335 support respective receive coils 340 and 345. Goggle 300 may also include other components of device 140 shown and described with respect to FIG. 1 but omitted from FIG. 3 for ease of illustration. The ear pieces are coupled to the frame 320 via hinges such that they may be folded towards the displays for each of storage and for charging in a charging station. Either ear piece may be folded first, with the other earpiece following and laying against the first folded ear piece.

Figure 4:
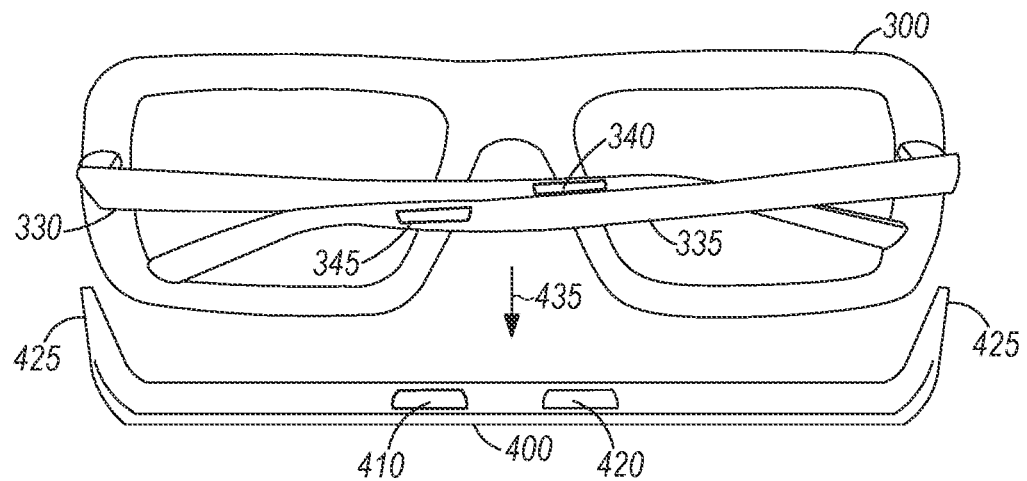
FIG. 4 is a side representation of smart goggle of FIG. 3 according to an example embodiment.

FIG. 4 is a side representation of smart goggle 300 with the left earpiece 330 having been folded first, followed by folding of the right earpiece 335. The goggle 300 is shown positioned above a charging station 400 having a first transmit coil 410 and a second transmit coil 420. Charging station 400 may be shaped with an opening 430 defined by sides 425 to help register the goggles 300 when inserted into the opening 430 as illustrated by arrow 435. Note that. when inserted, the receive coils 340 and 345 laterally align with transmit coils 410 and 420. However, the pair of coils 410 and 345 are closer together than coils 420 and 340. Thus, the signal between coils 410 and 345 will be stronger, and this pair will be selected. Note that if the earpieces were folded differently the other pair would likely be selected. In some examples, the further apart pair may be so far apart that little to no signal strength is detected.

Figure 5:
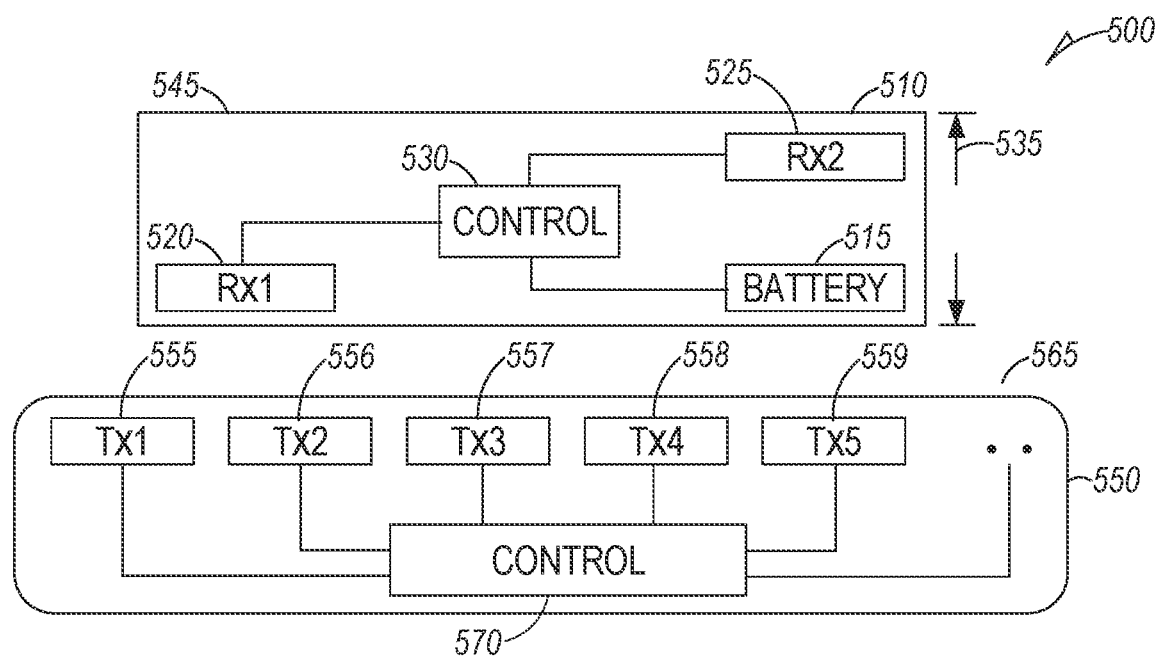
FIG. 5 is a block diagram illustrating an alternative system for wireless charging according to an example embodiment.

FIG. 5 is a block diagram illustrating an alternative system 500 for wireless charging. A device 510 includes a battery 515 that is configured to receive energy from at least one of two receive coils Rx1 and Rx2 indicated at 5:20 and 525. Control electronics 530 is coupled to the receive coils to control the charging of battery 515. Device 510 has a thickness, Z, indicated at 535. Receive coil 520 is shown close to a first side 540 of device 510 and receive coil 525 is shown closer to a second side 545 of device 510. As previously described, the coils may be integrated into the respective sides forming an enclosure for device 510 components.

System 500 includes a charging station 550 having multiple transmit coils 555, 556, 557, 558, and 559 for example positioned proximate a first charging surface 565 of station 550. In response to device 510 being placed close to or on the surface 565 of station 550, each of the transmit coils is polled in sequence, and control electronics 570 receives a signal strength indication from control electronics 530 via a wireless connection. In the orientation shown, the likely selected pair of receive and transmit coils includes receive coil 520, as it is closer to side 565 of station 550. The transmit coil may be any of transmit coils 555, 556, 557, 558, and 559 depending on where on surface 565 the device 510 is placed.

In a further example, the device 510 may be flipped over, such that. side 545 is placed on the charging surface 565. Following the same procedure above, receive coil 525 is the likely receive coil selected with a corresponding transmit coil having the highest signal strength. In either case, once a pair is selected, energy is transferred. Further pairs may also be used for energy transfer if it is desired to transfer energy faster, but perhaps less efficiently overall.

Figure 6:
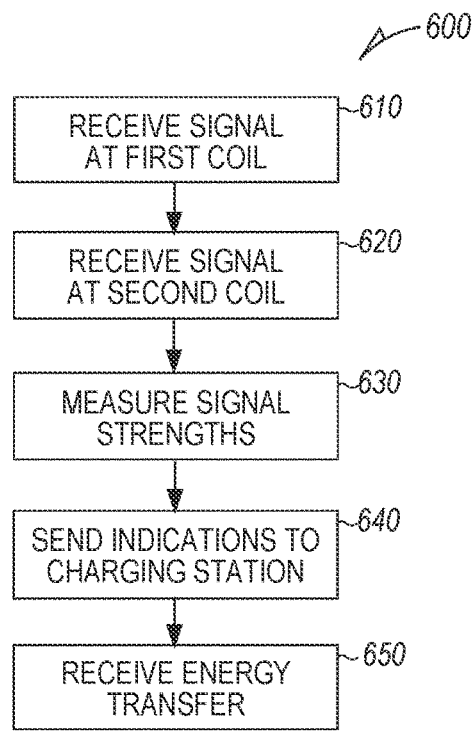
FIG. 6 is a flowchart illustrating a method of configuring a device to receive energy in a wireless manner according to an example embodiment.

FIG. 6 is a flowchart illustrating a method 600 of configuring a device to receive energy in a wireless manner. Method 600 includes an operation 610 to receive a first signal from a first transmit coil of a charging station at a first receive coil of the device. In various embodiments, the device may be a set of goggles or glasses for providing virtual or augmented reality experiences. The device may be any type of device having one or more batteries that may need recharging.

A second signal is received at a second receive coil from a different transmit coil of the charging station at operation 620. The first and second signal strengths received at each of the first and second receive coils are measured at operation 630. At operation 640, indications of the first and second signal strengths are sent to the charging station.

At operation 650, an energy transfer is received from the charging station at one of the first and second receive coils. At operation 660, a device batter is recharged with the receive transferred energy.

In one embodiment, each receive coil may receive signal signals from multiple transmit coils that are energized in succession. Each signal received at each receive coil has its signal strength measured and transmitted to the charging station. The device controller provides the indications of measured signal strength and may further provide one or more charging parameters for use during the energy transfer.

Figure 7:
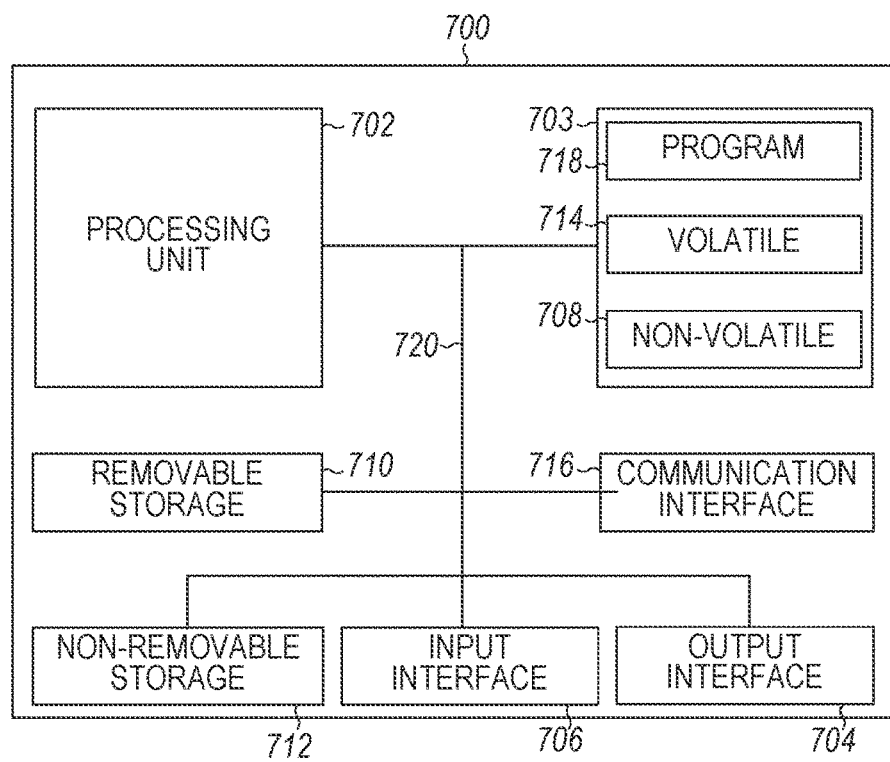
FIG. 7 is a block schematic diagram of a computer system to implement one or more example embodiments.

FIG. 7 is a block schematic diagram of a computer system 700 for implementing control electronics and devices and for performing methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments, For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves to the extent carrier waves are deemed too transitory. Storage can also include networked storage, such as a storage area network (SAN). Computer program 718 along with the workspace manager 722 may be used to cause processing unit 702 to perform one or more methods or algorithms described herein.

EXAMPLES

1. A machine implemented method includes alternately energizing multiple transmit coils in a first device, receiving indications of received signal strength at receive coils in a second device, selecting a first pair of coils including a first transmit coil and a first receive coil having the greatest received signal strength, and transferring energy from the first transmit coil to the first receive coil.

2. The method of example 1 wherein the first device comprises a charging station and the second device comprises a battery powered device having a battery that receives the transferred energy.

3. The method of example 2 wherein the second device is foldable such that receive coils change position in response to folding the second device.

4. The method of example 3 wherein the second device includes foldable ear stems of smart glasses, each stem having a receive coil, 5. The method of example 4 wherein the charging station has two charging coils positioned to align with the receive coils of the ear stems.

6. The method of example 5 wherein one of the receive coils is closer to one of the charging coils based on how the ear stems are folded and wherein the first pair of coils comprises the closer pair of coils.

7. The method of any of examples 1-6 and further including selecting a second pair of coils including a second transmit coil and a second receive coil having the second greatest received signal strength and transferring energy from the second transmit coil to the second receive coil.

8. The method of any of examples 1-7 wherein the first device has an opening keyed to receive the second device in a registered manner.

9. The method of any of examples 1-8 wherein alternately energizing the transmit coils comprises sequentially polling the transmit coils.

10. The method of any of examples 1-9 and further comprising detecting the presence of the second device prior to alternately energizing multiple transmit coils.

11. The method of any of examples 1-10 and further including receiving a charging parameter and controlling transferring energy in accordance with the received charging parameter.

12. A machine-readable storage device has instructions for execution by a processor of a machine to cause the processor to perform operations to perform a method. The operations include alternately energizing multiple transmit coils in a first device, receiving indications of received signal strength at receive coils in a second device, selecting a first pair of coils including a first transmit coil and a first receive coil having the greatest received signal strength, and transferring energy from the first transmit coil to the first receive coil.

13. The device of example 12, wherein the first device comprises a charging station and the second device comprises a battery powered device having a battery that receives the transferred energy.

14. The device of example 13 wherein the second device includes foldable ear stems of smart glasses, each stem having a receive coil, such that receive coils change position in response to folding.

15. The device of example 14 wherein the charging station has two charging coils positioned to align with the receive coils of the ear stems.

16. The device of example 15 wherein one of the receive coils is closer to one of the charging coils dependent on how the ear stems are folded and wherein the first pair of coils comprises the closer pair of coils.

17. The device of any of examples 12-16 wherein alternately energizing the transmit coils comprises sequentially polling the transmit coils.

18. The device of any of examples 12-17 wherein the operations further include receiving a charging parameter and controlling transferring energy in accordance with the received charging parameter.

19. A device includes a processor and a memory device coupled to the processor and having a program stored thereon for execution by the processor to perform operations. The operations include receiving a first signal at a first receive coil from a transmit coil of a charging station, receiving a second signal at a second receive coil from a different transmit coil of the charging station, measuring first and second signal strengths received at each of the first and second receive coils, sending indications of the first and second signal strengths to the charging station, and receiving energy transfer from the charging station at one of the first and second receive coils.

20. The method of example 19 wherein the operations further include sending a charging parameter and receiving the energy transfer in accordance with the sent charging parameter.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A. machine implemented method comprising:
alternately energizing multiple transmit coils in a first device;
for each energized transmit coil, receiving indications of received signal strength at each one of multiple receive coils in a. second device;
selecting a first pair of coils including a first transmit coil and a first receive coil having the greatest received signal strength from all the received indications of signal strengths;
controlling; the first transmit coil to transmit energy via a transmit controller in the first device;

controlling the first receive coil to receive energy via a receive controller in the second device; and transferring energy from the first transmit coil to the first receive coil.

2. The method of claim 1 wherein the first device comprises a charging station and the second device comprises a battery powered device having a battery that receives the transferred energy.

3. The method of claim 2 wherein the second device is foldable such that receive coils change position in response to folding the second device.

4. The method of claim 3 wherein the second device includes foldable ear stems of smart glasses, each stem having a receive coil.

5. The method of claim 4 wherein the charging station has a keyed charging surface with two charging coils positioned to laterally align with the receive coils of the ear stems, and wherein folding the ear stems changes a vertical distance of the receive coils from the charging surface.

6. The method of claim 5 wherein one of the receive coils is closer to one of the charging coils based on how the ear stems are folded and wherein the first pair of coils comprises the closer pair of coils.

7. The method of claim 1 and further comprising:
selecting a second pair of coils including a. second transmit coil and a second receive coil having the second greatest received signal strength; and
transferring energy from the second transmit coil to the second receive coil.

8. The method of claim 1 wherein the first device has an opening keyed to receive the second device in a registered manner.

9. The method of claim 1 wherein alternately energizing the transmit coils comprises sequentially polling the transmit coils.

10. The method of claim 1 and further comprising detecting the presence of the second device prior to alternately energizing multiple transmit coils.

11. The method of claim 1 and further comprising:
receiving a charging parameter prior to transferring energy between the selected first pair of coils; and
controlling transferring energy in accordance with the received charging parameter.

12. A non-transitory machine-readable storage device having instructions for execution by a processor of a machine to cause the processor to perform operations to perform a method, the operations comprising:
alternately energizing multiple transmit coils in a first device;
for each energized transmit coil, receiving indications of received signal strength at each one of multiple receive coils in a. second device;
selecting a first pair of coils including a first transmit coil and a first receive coil having the greatest received signal strength from all the received indications of signal strengths;
controlling the first transmit coil to transmit energy via a transmit controller in the first device;
controlling the first receive coil to receive energy via a receive controller in the second device; and
transferring energy from the first transmit coil to the first receive coil.

13. The device of claim 12 wherein the first device comprises a charging station and the second device comprises a battery powered device having a battery that receives the transferred energy.

14. The device of claim 13 wherein the second device includes foldable ear stems of smart glasses, each stem having a receive coil, such that receive coils change position in response to folding.

15. The device of claim 14 wherein the charging station has a charging surface with two charging coils positioned to align with the receive coils of the ear stems, and wherein folding the ear stems changes a distance of the receive coils from the charging surface.

16. The device of claim 15 wherein one of the receive coils is closer to one of the charging coils dependent on how the ear stems are folded and wherein the first pair of coils comprises the closer pair of coils.

17. The device of claim 12 wherein alternately energizing the transmit coils comprises sequentially polling the transmit coils.

18. The device of claim 12 wherein the operations further comprise:
receiving a charging parameter prior to transferring energy between the selected first pair of coils; and
controlling transferring energy in accordance with the received charging parameter.

19. A device comprising:
a processor; and
a memory device coupled to the processor and having a program stored thereon for execution by the processor to perform operations comprising:
receiving first signals at a first receive coil from each of multiple transmit coil of a charging station;
receiving second signals at a second receive coil from each of multiple transmit coils of the charging station;
measuring each of first and second signal strengths received at each of the first and second receive coils;
sending indications of the first and second signal strengths to the charging station; and
receiving energy transfer from one of the transmit coils of the charging station at one of the first and second receive coils having the greatest received signal strength from all the first and second signals received from the multiple transmit coils, wherein the one of the first and second receive coils is controlled to receive energy via a controller.

20. The method of claim 19 wherein the operations further comprise:
sending a charging parameter via the controller prior to receiving the energy transfer; and
receiving the energy transfer in accordance with the sent charging parameter.

* * * * *